United States Patent
Tamura (10) Patent No.: US 6,459,365 B2
(45) Date of Patent: Oct. 1, 2002

(54) DANGEROUS AREA ALARM SYSTEM

(75) Inventor: Kazuya Tamura, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/800,781

(22) Filed: Mar. 8, 2001

(30) Foreign Application Priority Data

Mar. 8, 2000 (JP) ........................................ 2000-064018

(51) Int. Cl.$^7$ ................................................ B60Q 1/00
(52) U.S. Cl. ................... 340/425.5; 340/435; 340/436; 340/438; 340/903; 701/117; 701/201; 701/301
(58) Field of Search .............................. 340/425.5, 435, 340/436, 438, 439, 440, 441, 903, 905, 938, 939, 988, 989, 990; 701/117, 119, 201, 300, 301, 302

(56) References Cited

U.S. PATENT DOCUMENTS

| | | | |
|---|---|---|---|
| 5,270,708 A | 12/1993 | Kamishima | 340/995 |
| 5,652,705 A | * 7/1997 | Spiess | 701/117 |
| 5,784,005 A | * 7/1998 | Akutsu et al. | 340/905 |
| 5,900,825 A | * 5/1999 | Pressel et al. | 340/905 |
| 5,963,148 A | * 10/1999 | Sekine et al. | 340/805 |
| 5,983,161 A | 11/1999 | Lemelson et al. | 701/301 |
| 6,012,012 A | * 1/2000 | Fleck et al. | 701/117 |
| 6,161,071 A | * 12/2000 | Shuman et al. | 701/48 |

FOREIGN PATENT DOCUMENTS

JP 4-44087 2/1992

OTHER PUBLICATIONS

International Publication No. WO 96/27513, published Sep. 12, 1996.

* cited by examiner

Primary Examiner—Daniel J. Wu
Assistant Examiner—Toan Pham
(74) Attorney, Agent, or Firm—Arent Fox Kintner Plotkin & Kahn (57) ABSTRACT

The present invention relates to a dangerous area alarm system. This system comprises a detection device which is provided in a vehicle and detects conditions of the vehicle to output vehicle data; a communication device which is provided in the vehicle and transmits the vehicle data output by the detection device; a server which is provided outside the vehicle and stores accident data regarding the conditions of vehicles involved in past accidents; a comparison device which is provided in the server and compares the vehicle data transmitted by the communication device with the accident data stored in the server; and an alarm device which issues an alarm to a driver of the vehicle when the comparison device determines that the vehicle data corresponds to the accident data.

11 Claims, 4 Drawing Sheets

DANGEROUS AREA ALARM SYSTEM

BACKGROUND OF THE INVENTION

1. Field of the Invention

The present invention relates to a dangerous area alarm system for alerting the driver of a vehicle of the presence of a dangerous area on the traveling route of the vehicle.

2. Description of Related Art

Conventional dangerous area alarm systems comprise a map database apparatus, and areas (locations) at which traffic accidents frequently occur are marked as dangerous areas in the map data of the map database apparatus. When a vehicle provided with this dangerous area alarm system approaches one of the marked areas, the alarm system informs the driver that there is a dangerous area on the traveling route of the vehicle. Another type of conventional dangerous area alarm system calculates the curvature of curves on the traveling road based on topography data stored in a map database, and if the curvature is sharper than a predetermined threshold, the system informs the driver of the vehicle that there is a dangerous curve on the traveling route.

However, in these conventional dangerous area alarm systems, the running conditions of the vehicle (vehicle speed, operating amount of the steering, etc.) and the environmental conditions (weather, time, such as morning or evening, etc.) are not considered in determining whether an area is dangerous.

Therefore, for example, even if a vehicle is running at a sufficiently slow speed in an area where traffic accidents occurred due to speeding, there is a tendency for unnecessary alarms to be sent to the driver. Moreover, because traffic accident data has to be stored in advance in the alarm system, and cannot be easily updated, when the traffic accident data become outdated, there is the problem that accurate alarms cannot be given.

SUMMARY OF THE INVENTION

The object of the present invention is to provide a dangerous area alarm system which can alert drivers in accordance with a variety of information, such as the running conditions of the vehicle and the environmental conditions.

Another object of the present invention is to provide a dangerous area alarm system in which traffic accident data can be updated in order to prevent inaccurate alarms.

In order to achieve the above objects, the dangerous area alarm system according to the first aspect of the present invention comprises a detection device which is provided in a vehicle and detects conditions of the vehicle to output vehicle data; a communication device which is provided in the vehicle and transmits the vehicle data output by the detection device; a server which is provided outside the vehicle and stores accident data regarding the conditions of vehicles involved in past accidents; a comparison device which is provided in the server and compares the vehicle data transmitted by the communication device with the accident data stored in the server; and an alarm device which issues an alarm to a driver of the vehicle when the comparison device determines that the vehicle data corresponds to the accident data.

According to this aspect, the detection device provided in a vehicle detects the conditions of the vehicle, and the communication device transmits the vehicle data to the server. The comparison device compares the vehicle data with the accident data stored in the server, and, if the vehicle data corresponds to the accident data, the alarm device issues an alarm to the driver of the vehicle. Therefore, this dangerous area alarm system alerts the driver when the present state of the vehicle is similar to the state of vehicles which were involved in accidents. Furthermore, because the server stores accident data regarding past accidents, it is easy to update the accident data.

In another aspect of the present invention, the detection device comprises a vehicle speed sensor and a present position (location) data production device. The vehicle speed sensor detects the speed of the vehicle and outputs vehicle speed data, and the present position data production device outputs present position data corresponding to the present position of the vehicle. The accident data include accident position data corresponding to positions where accidents occurred and accident vehicle speed data corresponding to speeds of vehicles involved in the accidents at the time the accidents occurred. The server comprises a vehicle condition estimating device, and the vehicle condition estimating device estimates the vehicle speed at the time the vehicle will arrive at (pass) the positions indicated by the accident position data based on the vehicle speed data and the present position data included in the vehicle data transmitted by the communication device. The comparison device compares the accident vehicle speed indicated by the accident vehicle data and the vehicle speed estimated by the vehicle condition estimating device. The alarm device issues an alarm to the driver if the vehicle speed estimated by the vehicle condition estimating device is equal to or higher than the accident vehicle speed. Therefore, it is possible to alert the driver in accordance with the present vehicle speed.

In another aspect of the present invention, the accident data further include accident running state data corresponding to running states of vehicles involved in past accidents. The detection device further comprises at least one of an accelerator sensor, a brake sensor, and a steering sensor. The vehicle condition estimating device estimates vehicle running states of the vehicle at the time the vehicle will pass position indicated by the accident position data based on outputs of the detection device. The comparison device compares the vehicle running states estimated by the vehicle condition estimating device with the accident running states indicated by the accident running state data, and the alarm device issues an alarm when the vehicle running states estimated by the vehicle condition estimating device correspond to the accident running states indicated by the accident running state data. Therefore, it is possible to alert the driver in accordance with the driver's operations of the accelerator, the brake, and/or the steering.

Another aspect of the present invention comprises a camera which takes images from around the vehicle and produces image data. The accident data further include at least one of accident weather data, which correspond to the weather at the time the past accidents occurred, and accident time data, which correspond to the time at which the past accidents occurred. The detection device comprises at least one of a weather discriminating device and a time data production device. This weather discriminating device discriminates or evaluates the weather at the location of the vehicle based on the image data output by the camera. The time data production device produces present time data corresponding to the present time based on the image data output by the camera. The comparison device performs at least one of a comparison of the accident weather data with the present weather data output by the weather discriminating device, and a comparison of the accident time data with the present time data output by the time data production device. Therefore, it is possible to alert the driver in consideration of the present time and/or the present weather.

In another aspect of the present invention, the accident data further include accident physical condition data corresponding to physical conditions of drivers of vehicles involved in past accidents. The detection device comprises at least one of a heart rate sensor, which detects heart rate of the driver of the vehicle, and a body temperature sensor, which detects body temperature of the driver of the vehicle. The vehicle condition estimating device estimates physical conditions of the driver at the time the vehicle will pass positions indicated by the accident position data based on outputs of the heart rate sensor and/or the body temperature sensor. The comparison device compares the physical conditions estimated by the vehicle condition estimating device with the accident physical conditions indicated by the accident physical condition data. The alarm device issues an alarm if the physical conditions estimated by the vehicle condition estimating device correspond to the accident physical conditions indicated by the accident physical condition data. According to this aspect, it is possible to alert the driver in consideration of the physical conditions of the driver.

Another aspect of the dangerous area alarm system comprises a navigation device which calculates a traveling route from the present position to a destination; a server which is provided outside the vehicle and stores accident data regarding conditions of vehicles involved in past accidents, and wherein the server comprises an extraction device which searches accident data corresponding to the traveling route from the accident data stored in the server, and a transmitting device which transmits the accident data extracted by the extraction device; a receiving device which is provided in the vehicle and receives the accident data transmitted by the transmitting device; a detection device which is provided in a vehicle and detects conditions of the vehicle to output vehicle data; a comparison device which is provided in the vehicle and compares the vehicle data output by the detection device with the accident data received by the receiving device; and an alarm device which issues an alarm to a driver of the vehicle when the comparison device determines that the vehicle data corresponds to the accident data.

According to this aspect, first, the navigation device calculates a traveling route from the present position to a destination. The traveling route data is transmitted to the extraction device, and the extraction device searches the accident data stored in the server for accident data corresponding to the traveling route. The transmitting device transmits the selected accident data, and the receiving device in the vehicle receives the selected accident data. The detection device detects conditions of the vehicle to output vehicle data, and the comparison device compares the vehicle data with the selected accident data. Then, if the vehicle data corresponds to the accident data, the alarm device issues an alarm to a driver of the vehicle. In this case, because the selected accident data are transmitted to the vehicle in advance, the alarm system can operate even when the vehicle is running in an area where radio communication cannot be made between the vehicle and the server.

DETAILED DESCRIPTION OF THE INVENTION

Hereinafter, preferred embodiments of the present invention will be explained referring to the figures. However, the present invention is not limited to the following embodiments, but includes various modifications.

Figure 1:
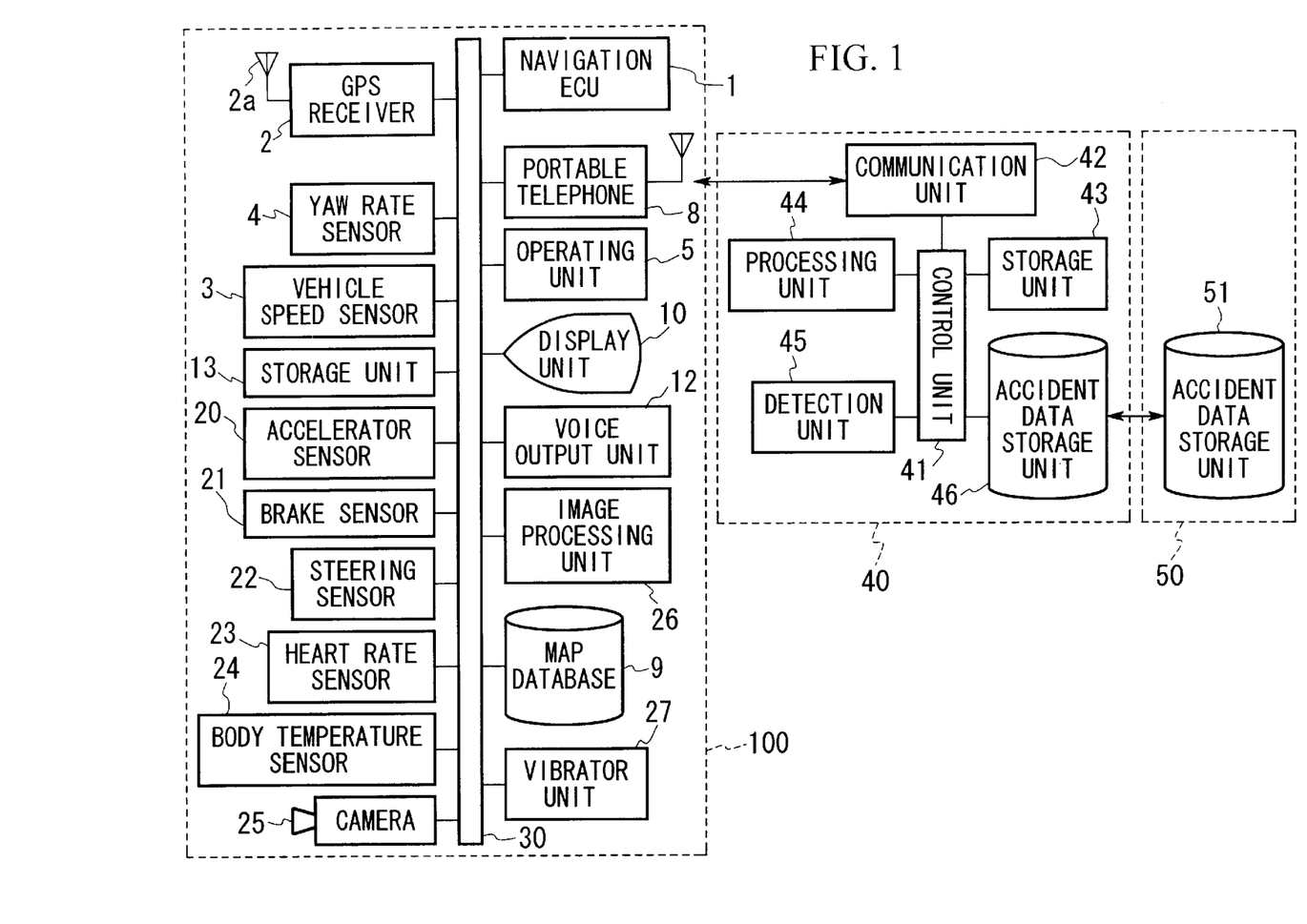
FIG. 1 is a block diagram illustrating a dangerous area alarm system according to an embodiment of the present invention.

FIG. 1 is a block diagram illustrating an on-vehicle navigation system including a dangerous area alarm system according to the first embodiment of the present invention. In FIG. 1, the on-vehicle navigation system comprises an on-vehicle equipment 100 provided on a vehicle, and a server 40 provided outside the vehicle. First, the on-vehicle equipment 100 will be explained.

The on-vehicle equipment 100 comprises a navigation ECU (Electrical Control Unit) 1, which comprises a ROM (Read Only Memory) storing navigation programs, a CPU (Central Processing Unit) which performs processing in accordance with the navigation programs stored in the ROM, and a RAM (Random Access Memory) which temporarily stores various data generated during the processing by the CPU. The navigation ECU 1 controls units of the navigation system by executing the navigation programs stored in the ROM. The on-vehicle equipment 100 comprises a GPS (Global Positioning System) receiver 2 which receives signals from the Global Positioning System, and the navigation ECU 1 generates present position data corresponding to the present position of the vehicle based on the signals received by the GPS receiver 2. The navigation ECU 1 calculates the traveling route based on the destination data input by the driver of the vehicle and the present position data generated by the navigation ECU 1, and guides the driver to the destination along the calculated traveling route. The navigation ECU 1 is connected via a bus 30 to the other units, and sends and receives various data to and from the units in order to control the units.

A GPS antenna 2a is connected to the GPS receiver 2. The GPS receiver 2 receives radio waves emitted from a plurality of global positioning satellites via the GPS antenna 2a, and calculates the present position of the vehicle based on the differences between the propagation times of the radio waves from the satellites, and transmits the present position data to the navigation ECU 1.

The on-vehicle equipment 100 further comprises a vehicle speed sensor 3, a yaw rate sensor 4, an operating unit 5, a mobile telephone 8, a map database 9, a display unit 10, a voice output unit 12, a storage unit 13, an accelerator sensor 20, a brake sensor 21, a steering sensor 22, a heart rate sensor 23, a body temperature sensor 24, a camera 25, an image processing unit 26, a vibrator unit 27, and all of them are connected to the bus 30.

The vehicle speed sensor 3 measures the traveling speed of the vehicle, and outputs vehicle speed data to the navigation ECU 1. The yaw rate sensor 4 detects the traveling direction of the vehicle, and outputs the traveling direction data to the navigation ECU 1. The navigation ECU 1 calculates the travel distance of the vehicle based on the vehicle speed data output by the vehicle speed sensor 3, and produces the present position data based on the travel distance data and the traveling direction data output by the yaw rate sensor 4.

The operating unit 5 has input keys, touch panels, joysticks, etc., and the driver can input and/or select the desired setting through the operating unit 5. The map database 9 has a data storage medium such as CD-ROMs or DVDs (Digital Versatile Disks) storing road map data for various areas, for example, in Japan, and a readout unit for reading the road map data from the data storage medium.

The display unit 10 comprises a display device such as a CRT (Cathode Ray Tube) or a LCD (Liquid Crystal Display), and the display device displays warnings in accordance with the instruction from the navigation ECU 1. The display unit 10 also displays a variety of information for guiding the driver to the destination. For example, the display unit 10 displays, using the information stored in the map database 9, road maps in the vicinity of the present position, the traveling route calculated by the navigation ECU 1, and the traveling direction to be kept by the vehicle. Moreover, the display unit 10 can display simplified shapes of intersections or interchanges when the vehicle approaches the intersections or interchanges.

The voice output unit 12 comprises a sound source such as a speaker, and outputs synthesized voices and/or sounds from the sound source in accordance with command signals from the navigation ECU 1 so as to warn the driver. The storage unit 13 includes a data storage device such as a hard disk device, an optical magnetic recording disk device, a non-volatile memory such as a flash memory, a volatile memory such as a RAM, or the combination thereof.

The accelerator sensor 20 measures the operating amount of the acceleration of the vehicle, for example, the degree of depression of the accelerator pedal or the degree of opening of a throttle valve, and the accelerator sensor 20 transmits the operating amount data to the navigation ECU 1. The brake sensor 21 measures the operating amount of the brake of the vehicle, for example, by detecting the depression amount of the brake pedal, and transmits the operating amount data to the navigation ECU 1. The steering sensor 22 measures the operating amount of the steering of the vehicle, for example, the rotation of the steering wheel, and the steering sensor 22 transmits the operating amount data to the navigation ECU 1.

The heart rate sensor 23 detects the heartbeat of the driver and transmits the heart rate data to the navigation ECU 1 as physical condition data. The body temperature sensor 24 measures the body temperature of the driver, and transmits the body temperature data to the navigation ECU 1 as physical condition data. The heart rate sensor 23 and the body temperature sensor 24 may be provided in the seat or seatbelt for the driver so that they can effectively detect the heartbeat and the body temperature of the driver when driving the vehicle. The heart rate sensor 23 and the body temperature sensor 24 may be provided at other positions in the vehicle. For example, the heart rate sensor 23 and the body temperature sensor 24 may be attached by a detachable wrist belt to the wrist of the driver. In this case, the output signals of the sensors 23 and 24 may be transmitted to the navigation ECU 1 by radio transmission via a radio transmitter and a radio receiver.

The camera 25 comprises an image pickup device such as a CCD, picks up the images of a road surface in the vicinity of the vehicle, and transmits the image data via the bus 30 to the image processing unit 26. Although the camera 25 may be provided as a dedicated one, the camera 25 may be also used for other purposes. For example, it is possible to simultaneously use the camera 25 for determining whether the vehicle is running in a suitable lane or for monitoring the outside of the vehicle. The image processing unit 26 calculates the present weather, for example, fine, overcast, rain, or snow, based on the image signals form the camera 25. The image processing unit 26 further calculates the road surface conditions, for example, wet, dry, or snowy, based on the image signals form the camera 25. The image processing unit 26 outputs these calculation results to the navigation ECU 1 as weather data.

The image processing unit 26 further calculates the present time, for example, the image processing unit 26 determines time blocks such as morning, daytime, evening, or night, and outputs the calculation results to the navigation ECU 1 as time data. Alternatively, the time data may be transmitted to the navigation ECU 1 from a clock unit provided on the vehicle. The vibrator unit 27 comprises a vibrator for vibrating at least one part contacting the driver such as the steering wheel, the seat, the seatbelt, etc, and, when the navigation ECU 1 outputs alarm signals to the vibrator unit 27, the vibrator unit 27 vibrates the contacting part in order to give an alarm to the driver.

The mobile telephone 8 transmits the vehicle data to the server 40 via a base station (not shown). The vehicle data includes the present position data corresponding to the present position where the vehicle is running, the vehicle speed data output from the vehicle speed sensor 3, the operating amount data, the physical condition data for the driver, and the time data. The transmission of data from the mobile telephone 8 is performed at the regular intervals, for example, every one minute. The mobile telephone 8 also receives alarm data sent from the server 40, and transmits the alarm data to the navigation ECU 1.

The server 40 comprises a control unit 41, a communication unit 42, a processing unit 44, a detection unit 45, and an accident data storage unit 46. The communication unit 42 receives the vehicle data sent from the mobile telephone 8, outputs the vehicle data to the control unit 41, and transmits the alarm data to the mobile telephone 8 via a base station based on command signals from the control unit 41.

The storage unit 43 receives the vehicle data transmitted from the mobile telephone 8 via the control unit 41, and stores the vehicle data for a predetermined period of time. For example, the storage unit 43 receives the vehicle data transmitted at one minute intervals, and stores each piece of the vehicle data for fifteen minutes. The accident data storage unit 46 stores in advance accident data regarding past accidents. Each piece of the accident data includes accident position data corresponding to the positions at which each of the past accidents occurred, and accident condition data corresponding to the conditions of each of the past accidents. The accident condition data includes data regarding the running conditions of the vehicles at the time they were involved in past accidents at positions indicated by the accident position data, and environmental data regarding the environment in the vicinity of the accident position indicated by the accident position data. The running condition data (accident running condition data) include, for example, accident vehicle speed data corresponding to the speeds of the vehicles involved in past accidents at the time the accidents occurred at the position indicated by the accident position data, data regarding whether the drivers of the vehicles involved in the accident made errors in steering at the time of the accidents, data regarding whether drivers of the vehicles involved in the accident delayed the braking operation at the time of the accidents, etc.

The environmental data include, for example, accident time data corresponding to the time (or time blocks) when the accidents occurred, such as morning, daytime, evening, or night. The environmental data further include weather data corresponding to weather conditions such as fine, overcast, rain, snow, etc., and road surface data corresponding to the condition of the road surface such as wet, dry, snowy, etc.

Furthermore, the accident condition data include accident physical condition data corresponding to the physical condition of drivers at the time the drivers were involved in accidents. The physical condition data include, for example, data indicating whether the drivers were excited or sleepy, and data indicating whether the conditions of the drivers were bad.

The data stored in the accident data storage unit 46 can be updated by inputting new accident data from the outside of the accident data storage unit 46. For example, the data stored in the accident data storage unit 46 can be updated by reading out new accident data from an accident data storage unit 51 provided in an information center 50, and storing the new accident data in the accident data storage unit 46.

The control unit 41 reads out at least two pieces of the present position data stored in the storage unit 43, and controls the processing unit 44 to calculate the traveling direction of the vehicle based on the difference between the pieces of data. The control unit 41 further controls the processing unit 44 to calculate the vehicle speed at the time the vehicle will arrive at the accident position indicated by the accident position data, based on the present position data and the difference between a plurality of pieces of the vehicle speed data stored in the storage unit 43. Instead, the estimated speed data may be calculated by reading out a plurality of pieces of the present position data stored in the storage unit 43, and by using the differences between the plurality of the position data pieces and the elapsed time therebetween.

The control unit 41 also calculates the average (ordinary) heart rate and the average (ordinary) body temperature of the driver based on the physical condition data stored in the storage unit 43, and stores the average heart rate and the average body temperature in the storage unit 43. Alternatively, the average heart rate and the average body temperature may be input by a user (including the driver) via the operating unit 5.

The control unit 41 calculates the possibility that the vehicle will be involved in a traffic accident similar to a past accident, based on the accident data extracted by the detection unit 45 and the vehicle data stored in the storage unit 43. That is, the control unit 41 compares each of the values in the vehicle data with the values in the accident data, and determines whether the vehicle running state is similar to the states in which the past accident occurred (for example, the conditions relating the accident causes, the environmental conditions, etc.). If the control unit 41 determines that the vehicle running states are similar to the states in the past accident, the control unit 41 controls the communication unit 42 to send an alarm signal to the mobile telephone 8 in the vehicle. Then, the control unit 41 controls the units as is explained later.

The detection unit 45 determines whether there are accident data relating to the vicinity of the present position based on the present position data stored in the storage unit 43 and the accident position data stored in the accident data storage unit 46. The amplitude of the vicinity to be searched by the detection unit 45 may be set to a predetermined value in advance or may be set by the driver or the occupants. Furthermore, the detection unit 45 selects, from the searched accident data, the accident data corresponding to the traveling direction calculated by the control unit 41.

The information center 50 may be a Mayday call center (search and rescue call center), and comprises an accident data storage unit 51. The accident data storage unit 51 stores position data corresponding to the position where past accidents occurred and condition data corresponding to the conditions in which the past accidents occurred. The accident data storage unit 51 updates the stored data by sequentially storing new accident data based on reports regarding new traffic accidents, etc. Thus, the accident data storage unit 51 constructs a database including a large number of accident data therein.

Figure 2:
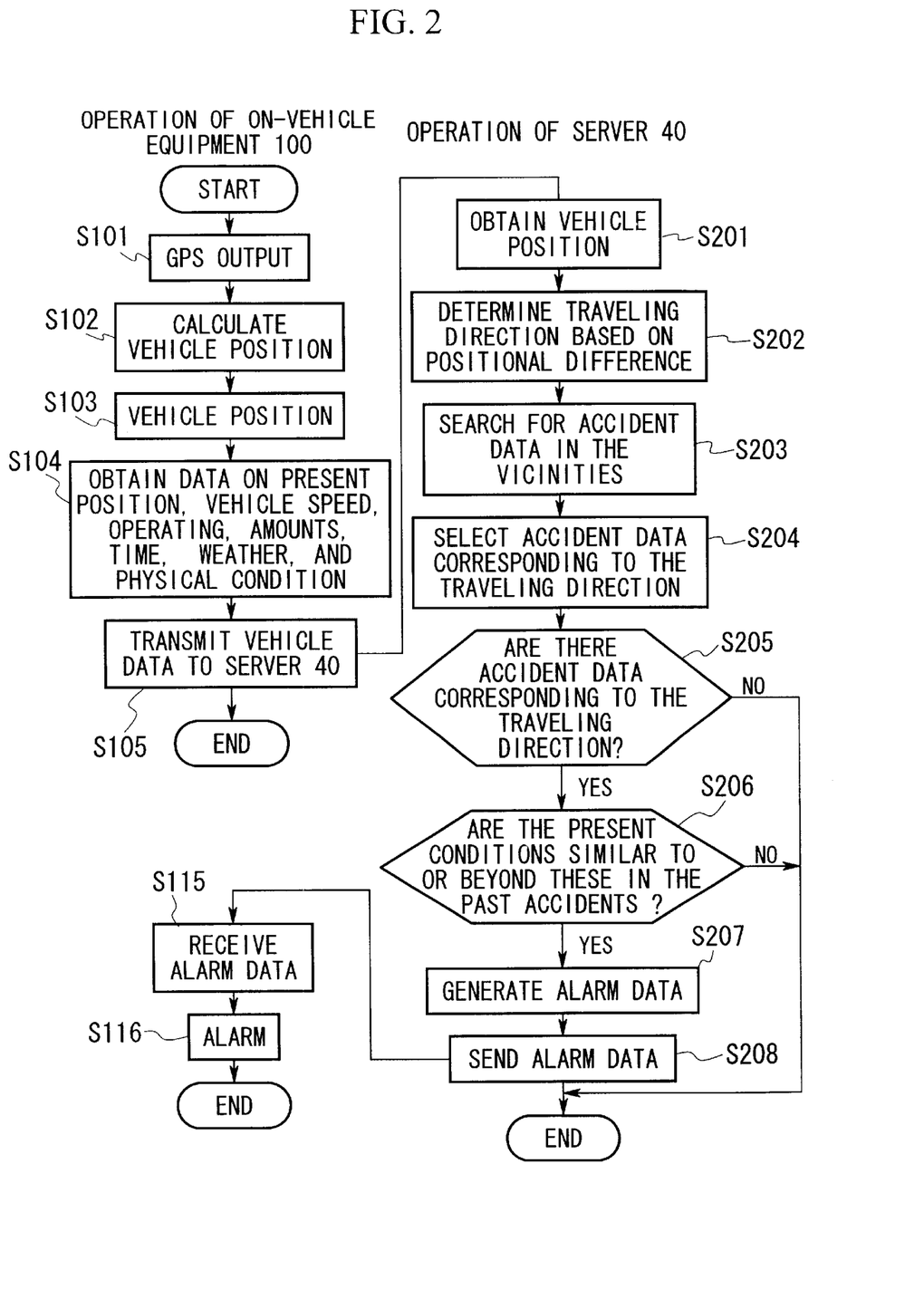
FIG. 2 is a flowchart showing the operation of the dangerous area alarm system shown in FIG. 1.

Next, the operation of the dangerous area alarm system shown in FIG. 1 will be explained referring to the flowchart shown in FIG. 2. First, the navigation system is switched on, and the driver or the passenger inputs destination data to the navigation system. When the vehicle is running, the GPS receiver 2 receives signals from a Global Positioning System in step S101, and outputs the signals to the navigation ECU 1. In step S102, the navigation ECU 1 calculates the present position of the vehicle based on the signals transmitted from the GPS receiver 2, and in step S103, the navigation ECU 1 outputs the present position data.

The camera 25 picks up the images of the surroundings of the vehicle, and outputs the image data to the image processing unit 26. The image processing unit 26 calculates the time data and the weather data based on the image data, and outputs the time data and the weather data to the navigation ECU 1. The heart rate sensor 23 detects the heartbeat of the driver, the body temperature sensor 24 measures the body temperature of the driver, and the sensors 23 and 24 output the respective data to the navigation ECU 1 as physical condition data.

In step S104, the navigation ECU 1 receives the vehicle speed data output from the vehicle speed sensor 3, and the operating amount data respectively output from the accelerator sensor 20, the brake sensor 21, and the steering sensor 22. Furthermore, the navigation ECU 1 receives the time data and the weather data output from the image processing unit 26, and the physical condition data output from the heart rate sensor 23 and the body temperature sensor 24.

The navigation ECU 1 receives the above data at regular intervals, and transmits all the data to the mobile telephone 8 as vehicle data. In step S105, the mobile telephone 8 transmits the vehicle data to the server 40 when receiving the vehicle data from the navigation ECU 1.

In the server 40, the communication unit 42 receives the vehicle data from the mobile telephone 8, and outputs the received vehicle data to the control unit 41. The control unit 41 controls the storage unit 43 so as to temporarily store each piece of the vehicle data for a predetermined period of time.

In step S201, the control unit 41 reads out the present position data corresponding to two positions, and in step S202, the control unit 41 calculates the traveling direction of the vehicle based on the difference between the two pieces of the present position data. The control unit 41 transmits the present position data and the traveling direction data to the detection unit 45, and commands the detection unit 45 to search for accident data corresponding to the present traveling route of the vehicle.

In step S203, the detection unit 45 firstly searches for accident data corresponding to the vicinity of the present position of the vehicle, from the accident position data included in the accident data stored in the accident data storage unit 46, based on the present position data output from the control unit 41.

Next, in step S204, the detection unit 45 searches for accident data corresponding to the present traveling direction of the vehicle, from the accident data corresponding to the vicinity of the present position of the vehicle, using the present position data, the traveling direction data, and the accident position data included in the selected accident data. In step S205, the detection unit 45 determines whether there is at least one set of accident data corresponding to the present traveling route, and if there is no such accident data, the server 40 terminates the flow.

In contrast, if there is at least one accident data corresponding to the present traveling route, the processing unit 44 calculates the vehicle speed at the time the vehicle will pass the accident position indicated by the selected accident data, and the estimated vehicle speed data output from the processing unit 44 is stored in the storage unit 43.

Next, in step S206, the control unit 41 compares the vehicle data stored in the storage unit 43 with the accident data stored in the accident data storage unit 46, and determines whether the present running conditions of the vehicle are similar to those of vehicles involved in the past accidents. That is, the control unit 41 compares the estimated vehicle speed data stored in the storage unit 43 with the accident vehicle speed data contained in the selected accident data. If the estimated vehicle speed data is lower than the accident vehicle speed data contained in the selected accident data, the control unit 41 terminates the flow. The estimated vehicle speed data may be compared with the value obtained by multiplying a safety factor, which is less than 1, by the vehicle speed value contained in the selected accident data.

If the estimated vehicle speed data is equal to or higher than the vehicle speed data contained in the selected accident data, the flow proceeds to step S207, and the control unit 41 generates an alarm signal data in accordance with the difference between the two sets of data. That is, the alarm signal is changed in correspondence to the magnitude of the difference. However, the alarm signal may also be constant. The control unit 41 transmits the alarm signal data to the communication unit 42, and in step S208, the communication unit 42 transmits the alarm signal data to the mobile telephone 8.

In the on-vehicle equipment 100, when the mobile telephone 8 receives the alarm signal data from the server 40 in step S115, the received alarm signal data are transmitted to the navigation ECU 1, and in step S116, the navigation ECU 1 gives the alarm to the driver. The method for alerting the driver is not limited in the present invention. In this embodiment, when the difference between the estimated vehicle speed data and the vehicle speed data contained in the selected accident data is smaller than a predetermined threshold value, the display unit 10 displays the statement that "Maintaining this speed is dangerous!" on the display unit 10, and the voice output unit 12 announces the same statement. In addition, the navigation ECU 1 activates the vibrator unit 27 to vibrate the steering wheel and/or the driver's seat. In contrast, when the difference between the estimated vehicle speed data and the vehicle speed data contained in the selected accident data is equal to or greater than the predetermined threshold value, the display unit 10 displays an emphatic warning "Slow down immediately!" on the display unit 10, and the voice output unit 12 announces the same warning. It is also possible to increase the vibration by the vibrator unit 27.

The above dangerous area alarm system alerts the driver only when the present state of the vehicle is similar to the state of vehicles which were involved in accidents. Therefore, it is possible to prevent unnecessary alarms from being sent to the driver. Furthermore, because the server stores accident data regarding past accidents, it is easy to update the accident data based on information regarding new traffic accidents such as those collected by Mayday call centers or those registered on the Internet.

Also, because this system gives alarms to the driver based on a large amount of information which has been stored in the server, the precision of the alarms can be improved.

Furthermore, if the server is linked to urgent information services, because the server can receive the latest accident information from the services, the driver can obtain the information through this system and avoid traffic jams caused by accident.

The above explanation was made for the case where the comparison is made only between the estimated vehicle speed data and the vehicle speed data contained in the selected accident data. However, the present invention is not limited to such a constitution, but it is also possible to perform at least one of the comparisons of operating amount data, time data, weather data, and physical condition data, in addition to the comparison of the speed data, and to alert the driver when all the compared data are similar to each other. For example, in a preferable embodiment, when the location indicated by the accident position data contained in the selected accident data is a curve in a road, and operating amount data stored in the storage unit 43 is compared with the operating amount data contained in the accident data stored in the accident data storage unit 46. The operating amount data is at least one of the operating amount data of the accelerator (that is, the degree of depression of the accelerator pedal), the operating amount data of the brake of the vehicle (that is, the degree of depression of the brake pedal), and the operating amount data of the steering (that is, the steering angle). The processing unit 44 calculates the running state data of the vehicle at the time the vehicle will pass the location indicated by the accident position data, based on the present position data, the present vehicle speed data, the data output from the accelerator sensor 20, and the data output from the brake sensor 21. That is, the possibility of acceleration of the vehicle is estimated based on the degree of depression of the accelerator pedal, the possibility of deceleration of the vehicle is estimated based on the depression amount of the brake pedal, and the vehicle speed at the time the vehicle will pass the location where a past accident occurred is calculated by adding these estimated results. If the calculated vehicle speed is equal to or higher than the accident vehicle speed, it is determined whether the steering operation by the driver will be dangerous at the time the vehicle will pass the location where the past accident occurred based on the data of the steering sensor 22. If it is estimated that the steering angle made by the driver will be excessive in comparison with the curvature of the curve, that is, if it is estimated that the vehicle will not be able to safely pass the curve, an alarm will be given to the driver, for example, indicating that "There is a curve ahead, maintaining this speed is danger" or "Return the steering".

Furthermore, for example, when the selected accident data indicates that the past accident occurred in the evening, the present time data contained in the vehicle data is compared with the accident time data contained in the accident data. If the present time data is similar to the accident time data, that is, if the present time data indicates evening, this system alerts the driver. In contrast, if the present time data is not similar to the accident time data, for example, if the present time is morning, the system does not alert the driver. Thus, it is possible to prevent unnecessary alarms.

Furthermore, for example, when the selected accident data indicates that the past accident occurred due to slipping on compressed snow covering the road surface, the weather data contained in the vehicle data is compared with the weather data contained in the accident data. If the present weather data is similar to the accident weather data, that is, if the present weather data indicates compressed snow, this system alerts the driver, for example, by announcing "Caution: Slippery surface ahead". In contrast, if the present weather data is not similar to the accident weather data, for example, if the road surface is dry, the system does not alert the driver. Thus, it is possible to give alarms to the driver based on the weather conditions.

Furthermore, for example, when the selected accident data indicates that the past accident occurred due to enthusiasm of the driver in conversation with fellow passengers, or when the selected accident data indicates that the driver was excited at a speed higher than a legal limit when the driver was involved in the past accident, the present physical condition data contained in the vehicle data are compared with the physical condition data contained in the accident data. That is, the processing unit 44 calculates estimated heart rate and estimated body temperature of the driver of the time when the vehicle will pass the location indicated by the accident position data included in the accident data, based on data from the heart rate sensor 23 and the body temperature sensor 24. In order to calculate the estimated heart rate and the estimated body temperature, a plurality (for example, two) of pieces of heart rate data which were output by the heart rate sensor 23 and are stored in the storage unit 43, and a plurality (for example, two) of the body temperature data which were output by the body temperature sensor 24 and are stored in the storage unit 43, are respectively read out from the storage unit 43. Then, the estimated heart rate and the estimated body temperature are respectively calculated using extrapolation based on the changes of the plurality of the data. The control unit 41 compares the estimated heart rate and the estimated body temperature with a predetermined ordinary heart rate and a predetermined ordinary body temperature of the driver registered in advance. If the estimated heart rate and the estimated body temperature are respectively greater than the ordinary heart rate and the ordinary body temperature, the control unit 41 determines that the driver will be excited when the vehicle will pass the location where the past accident occurred, and this system alerts the driver, for example, by announcing an alarm such as "Slow down". Simultaneously, it is possible to announce a proposal such as "You should take a rest". In contrast, if the present physical condition data are not similar to the accident physical condition data, for example, if the estimated heart rate and the estimated body temperature are not greater than the ordinary heart rate and the ordinary body temperature, the system does not alert the driver. Thus, it is possible to give alarms to the driver based on the driver's physical conditions.

The above operations of this dangerous area alarm system are repeated at predetermined intervals until the vehicle arrives at the destination.

Figure 3:
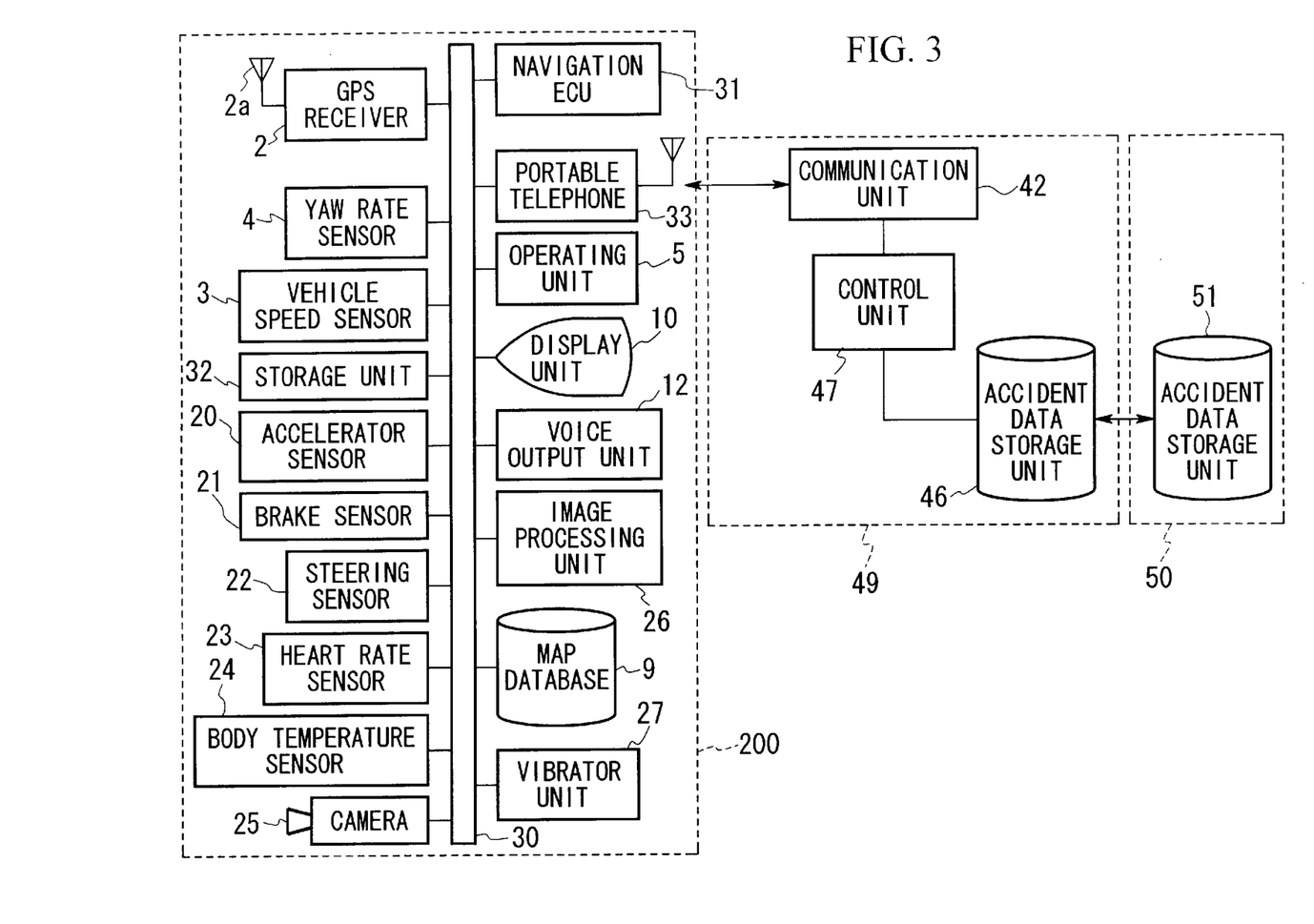
FIG. 3 is a block diagram illustrating a dangerous area alarm system according to another embodiment of the present invention.

Next, a second embodiment of the present invention will be explained with referring to FIG. 3. FIG. 3 is a block diagram illustrating a navigation system including a dangerous area alarm system according to the second embodiment of the present invention. In FIG. 3, elements corresponding to the elements shown in FIG. 1 have the same reference numbers as those shown in FIG. 1, and explanations thereof will be omitted.

In this embodiment, the mobile telephone 33 of the on-vehicle equipment 200 transmits traveling route data calculated by the navigation ECU 31 to the communication unit 42 in a server 49, and receives the selected accident data transmitted by the communication unit 42. The received accident data is transmitted to the navigation ECU 31 via the bus 30.

The navigation ECU 31 calculates the vehicle speed at the time the vehicle will pass the location indicated by the accident position data contained in the accident data. The navigation ECU 31 calculates the possibility that the vehicle will be involved in a traffic accident in a manner similar to vehicles involved in the past accidents, based on the accident data from the mobile telephone 33 and vehicle data obtained by sensing units provided in the vehicle. If the navigation ECU 31 determines that the vehicle data are similar to the accident data with respect to conditions under which past traffic accidents occurred, this dangerous area alarm system alerts the driver using the display unit 10, the voice output unit 12, and/or the vibrator unit 27. A storage unit 32 is provided for temporarily storing the accident data output from the navigation ECU 31. In addition, the storage unit 32 performs the same functions as those of the storage unit 13 in the first embodiment.

In the server 49, the control unit 47 searches the accident data stored in the accident data storage unit 46, for accident data corresponding to the present traveling route, based on the traveling route data received by the communication unit 42. If there are any corresponding data, the control unit 47 reads out the corresponding data, and transmits the corresponding data to the mobile telephone 33 via the communication unit 42.

Figure 4:
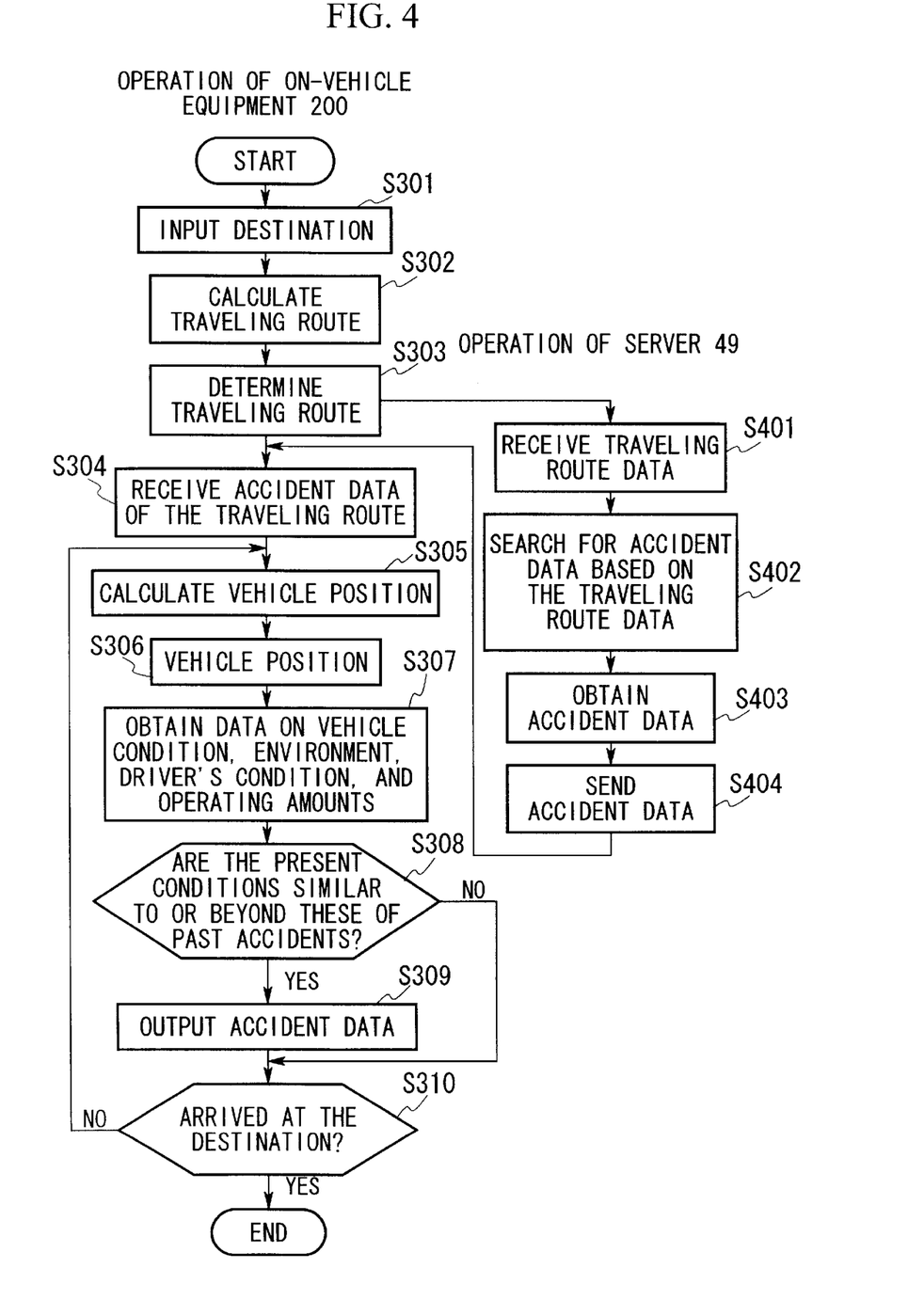
FIG. 4 is a flowchart showing the operation of the dangerous area alarm system shown in FIG. 3.

Next, referring to the flowchart shown in FIG. 4, the operation of the dangerous area alarm system shown in FIG. 3 will be explained.

First, the navigation system is switched on, and the driver or a passenger inputs destination data into the navigation system in step S301. When the vehicle is running, the GPS receiver 2 receives signals from a Global Positioning System, and outputs the signals to the navigation ECU 31. The navigation ECU 31 calculates the present position of the vehicle based on the signals transmitted from the GPS receiver 2, and outputs the present position data. Furthermore, in step S302, the navigation ECU 31 calculates the traveling route of the vehicle based on the destination data and the present position data, and sets the obtained route as the traveling route of the vehicle in step S303. Then, the navigation ECU 31 transmits the traveling route data to the mobile telephone 33, and the mobile telephone 33 transmits the traveling route data to the communication unit 42 of the server 49.

In the server 49, the communication unit 42 receives the traveling route data in step S401, and outputs the received data to the control unit 47. In step S402, the control unit 47 searches the accident data stored in the accident data storage unit 46 for accident data corresponding to the traveling route data, and, if any, reads out the corresponding accident data from the accident data storage unit 46 in step S403. The control unit 47 outputs the selected accident data to the communication unit 42, and the communication unit 42 transmits the selected accident data to the mobile telephone 33 in step S404.

In the on-vehicle equipment 200, when the mobile telephone 33 receives the selected accident data from the server 49 in step S304, the mobile telephone 33 outputs the received data to the navigation ECU 31. The navigation ECU 31 temporarily stores the selected accident data in the storage unit 32. Furthermore, in step S305, the navigation ECU 31 calculates the present position of the vehicle based on signals output from the GPS receiver 2, and outputs the present position data in step S306.

The camera 25 picks up the images of the surroundings of the vehicle, and outputs the image data to the image processing unit 26. The image processing unit 26 calculates the present time and the weather based on the image data, and outputs the time data and the weather data to the navigation ECU 31. The heart rate sensor 23 detects heartbeat of the driver, the body temperature sensor 24 measures a body temperature of the driver, and the sensors 23 and 24 output the respective data to the navigation ECU 31 as physical condition data.

In step S307, the navigation ECU 31 obtains vehicle speed data based on the output from the vehicle speed sensor 3, and obtains operating amount data based on the output from the accelerator sensor 20, the brake sensor 21, and the steering sensor 22. Furthermore, the navigation ECU 31 obtains time data and weather data based on the output from the image processing unit 26, and obtains physical condition data based on the outputs from the heart rate sensor 23 and the body temperature sensor 24.

The navigation ECU 31 obtains the above data at regular intervals, produces vehicle data containing all the above data, and temporarily stores the vehicle data in the storage unit 32. Then, the navigation ECU 31 calculates an estimated vehicle speed at the time the vehicle will pass the position specified by the accident position data included in the selected accident data, based on the vehicle speed data stored in the storage unit 32 and the accident position data, and stores the estimated vehicle speed data in the storage unit 32.

Next, in step S308, the navigation ECU 31 compares the selected accident data stored in the storage unit 32 with the vehicle data stored in the storage unit 32, and determines whether the present running state is similar to the running state in which the past accident occurred. That is, the navigation ECU 31 compares the estimated vehicle speed stored in the storage unit 32 with the accident vehicle speed at which vehicles were involved in the past accidents.

If the estimated vehicle speed is lower than the accident vehicle speed, the navigation ECU 31 determines in step S310 whether the vehicle has arrived at the destination. If the vehicle has already arrived at the destination, the navigation ECU 31 terminates the flow. If the vehicle has not arrived yet at the destination, the flow returns to step S305.

In contrast, if the estimated vehicle speed is equal to or higher than the accident vehicle speed, the flow proceeds to step S309, and the navigation ECU 31 alerts the driver in accordance with the difference between the estimated vehicle speed and the accident vehicle speed. The operation for comparing the running states and the operation for alerting the driver may be performed in manners similar to those in the first embodiment. After alerting the driver, the navigation ECU 31 determines in step S310 whether the vehicle has arrived at the destination. If the vehicle has already arrived at the destination, the navigation ECU 31 terminates the flow. If the vehicle has not arrived yet at the destination, the flow returns to step S305.

According to this embodiment, because the accident data corresponding to the present traveling route are transmitted to the vehicle in advance, the alarm system can operate even when the vehicle is running in an area where radio communication cannot be made between the vehicle and the server. Furthermore, all the selected accident data can be sent to the vehicle at once, the communication time can be shortened, and the communication cost can be reduced.

In the above embodiments, the present position of the vehicle is measured by the GPS receiver 2. However, the present position may be determined based on travel distance calculated using the output of the vehicle speed sensor 3 and traveling direction calculated using the output of the yaw rate sensor 4. Furthermore, the present position may be determined by using the DGPS (Differential Global Positioning System).

In addition, the communication media of the mobile telephone 8 and mobile telephone 33 may be the IMT-2000 (International Mobile Telecommunication).

The present invention is not limited to the above embodiments, but includes various modifications in the scope of the claims.

What is claimed is:

1. A dangerous area alarm system comprising:
   a detection device, which is provided in a vehicle, detects a condition of the vehicle to output vehicle data;
   a communication device, which is provided in the vehicle, transmits the vehicle data output by the detection device;
   a server, which is provided outside the vehicle, comprises an accident data storage unit which stores accident data regarding the conditions of vehicles involved in past accidents;
   a comparison device, which is provided in the server, compares the vehicle data transmitted by the communication device with the accident data stored in the server; and
   an alarm device which issues an alarm to a driver of the vehicle when the comparison device determines that the vehicle data corresponds to the accident data
   wherein the accident data storage unit updates the accident data based on reports regarding new traffic accidents.

2. A dangerous area alarm system according to claim 1, wherein
   the detection device comprises a vehicle speed sensor which detects a speed of the vehicle and outputs vehicle speed data, and a present position data production device which outputs present position data corresponding to a present position of the vehicle;
   the accident data includes accident position data corresponding to positions where accidents occurred and accident vehicle speed data corresponding to speeds of vehicles involved in the accidents at the time the accidents occurred;
   the server further comprises a vehicle condition estimating device which estimates the vehicle speed at the time the vehicle will arrive at position indicated by the accident position data based on the vehicle speed data and the present position data included in the vehicle data transmitted by the communication device;
   the comparison device compares the accident vehicle speed indicated by the accident vehicle data and the vehicle speed estimated by the vehicle condition estimating device; and
   the alarm device issues an alarm to the driver if the vehicle speed estimated by the vehicle condition estimating device is equal to or greater than the accident vehicle speed.

3. A dangerous area alarm system according to claim 2, wherein the accident data further includes accident running state data corresponding to running states of vehicles involved in past accidents;

the detection device further comprises at least one of an accelerator sensor which detects operating amount of an accelerator of the vehicle, a brake sensor which detects operating amount of a brake of the vehicle, and a steering sensor which detects operating amount of a steering of the vehicle;

the vehicle condition estimating device estimates vehicle running states of the vehicle at the time the vehicle will pass position indicated by the accident position data based on outputs of the detection device;

the comparison device compares the vehicle running states estimated by the vehicle condition estimating device with the accident running states indicated by the accident running state data; and the alarm device issues an alarm when the vehicle running states estimated by the vehicle condition estimating device correspond to the accident running states indicated by the accident running state data.

4. A dangerous area alarm system according to claim 1, further comprising a camera which takes images from around the vehicle and produces image data; and wherein the accident data further includes at least one of accident weather data, which corresponds to the weather at the time the past accidents occurred, and accident time data, which corresponds to the time at which the past accidents occurred;

the detection device comprises at least one of a weather discriminating device, which discriminates the weather at the location of the vehicle to output present weather data based on the image data output by the camera, and a time data production device, which produces present time data corresponding to the present time based on the image data output by the camera; and the comparison device performs at least one of a comparison of the accident weather data with the present weather data output by the weather discriminating device, and a comparison of the accident time data with the present time data output by the time data production device.

5. A dangerous area alarm system according to claim 1, wherein the accident data further includes accident physical condition data corresponding to physical conditions of drivers of vehicles involved in past accidents;

the detection device comprises at least one of a heart rate sensor, which detects a heart rate of the driver of the vehicle, and a body temperature sensor, which detects a body temperature of the driver of the vehicle;

the vehicle condition estimating device estimates physical conditions of the driver at the time the vehicle will pass position indicated by the accident position data based on outputs of the heart rate sensor and/or the body temperature sensor;

the comparison device compares the physical conditions estimated by the vehicle condition estimating device with the accident physical conditions indicated by the accident physical condition data; and the alarm device issues an alarm when the physical conditions estimated by the vehicle condition estimating device correspond to the accident physical conditions indicated by the accident physical condition data.

6. A dangerous area alarm system according to claim 1, wherein the server comprises a storage unit which stores the vehicle data for a predetermined period of time, and a control unit which reads out at least two pieces of position data stored in the storage unit and calculates a traveling direction and speed of the vehicle based on the difference between the pieces of the position data.

7. A dangerous area alarm system comprising:

a navigation device which calculates a traveling route from a present position to a destination;

a server, which is provided outside the vehicle, stores accident data regarding conditions of vehicles involved in past accidents, and wherein the server comprises an extraction device which searches accident data corresponding to the traveling route from the accident data stored in the server, and a transmitting device which transmits accident data found by the extraction device;

a communication device which is provided in the vehicle, transmits the traveling route calculated by the navigation device to the extraction device, and receives the accident data transmitted by the transmitting device;

a detection device, which is provided in a vehicle, detects conditions of the vehicle to output vehicle data;

a comparison device, which is provided in the vehicle, compares the vehicle data output by the detection device with the accident data received by the communication device; and an alarm device which issues an alarm to a driver of the vehicle when the comparison device determines that the vehicle data corresponds to the accident data.

8. A dangerous area alarm system according to claim 7, wherein the accident data includes accident position data corresponding to a position where accidents occurred and accident vehicle speed data corresponding to speeds of vehicles involved in the accidents when each accident occurred;

the detection device comprises:

a present position data production device which outputs present position data corresponding to the present position of the vehicle;

a vehicle speed sensor which detects the speed of the vehicle and outputs vehicle speed data; and a vehicle condition estimating device which estimates vehicle speed at the time the vehicle will arrive at position indicated by the accident position data based on the vehicle speed data and the present position data;

the comparison device compares the accident vehicle speed indicated by the accident vehicle data and the vehicle speed estimated by the vehicle condition estimating device; and the alarm device issues an alarm to the driver if the vehicle speed estimated by the vehicle condition estimating device is equal to or greater than the accident vehicle speed.

9. A dangerous area alarm system according to claim 8, wherein the accident data further includes accident running state data corresponding to running states of vehicles involved in past accidents;

the detection device further comprises at least one of an accelerator sensor which detects an operating amount of an accelerator of the vehicle, a brake sensor which detects an operating amount of a brake of the vehicle, and a steering sensor which detects an operating amount of a steering of the vehicle;

the vehicle condition estimating device estimates vehicle running states of the vehicle at the time the vehicle will pass position indicated by the accident position data based on outputs of the detection device;

the comparison device compares the vehicle running states estimated by the vehicle condition estimating device with the accident running states indicated by the accident running state data; and the alarm device issues an alarm when the vehicle running states estimated by the vehicle condition estimating device correspond to the accident running states indicated by the accident running state data.

10. A dangerous area alarm system according to claim 7, further comprising a camera which takes images from around the vehicle and produces image data; and wherein the accident data further include at least one of accident weather data, which corresponds to the weather at the time the past accidents occurred, and accident time data, which corresponds to the time at which the past accidents occurred;

the detection device comprises at least one of a weather discriminating device, which discriminates the weather at the location of the vehicle to output present weather data based on the image data output by the camera, and a time data production device, which produces present time data corresponding to the present time based on the image data output by the camera; and the comparison device performs at least one of a comparison of the accident weather data with the present weather data output by the weather discriminating device, and a comparison of the accident time data with the present time data output by the time data production device.

11. A dangerous area alarm system according to claim 7, wherein the accident data further includes accident physical condition data corresponding to physical conditions of drivers of vehicles involved in past accidents;

the detection device comprises at least one of a heart rate sensor, which detects a heart rate of the driver of the vehicle, and a body temperature sensor, which detects a body temperature of the driver of the vehicle;

the vehicle condition estimating device estimates physical conditions of the driver at the time the vehicle will pass position indicated by the accident position data based on outputs of the heart rate sensor and/or the body temperature sensor;

the comparison device compares the physical conditions estimated by the vehicle condition estimating device with the accident physical conditions indicated by the accident physical condition data; and the alarm device issues an alarm when the physical conditions estimated by the vehicle condition estimating device correspond to the accident physical conditions indicated by the accident physical condition data.

* * * * *